US009218700B2

(12) United States Patent
Gautama et al.

(10) Patent No.: US 9,218,700 B2
(45) Date of Patent: Dec. 22, 2015

(54) METHOD AND SYSTEM FOR SECURE AND AUTHORIZED COMMUNICATION BETWEEN A VEHICLE AND WIRELESS COMMUNICATION DEVICES OR KEY FOBS

(71) Applicant: GM GLOBAL TECHNOLOGY OPERATIONS LLC, Detroit, MI (US)

(72) Inventors: Neeraj R. Gautama, Whitby (CA); Amanda J. Kalhous, Ajax (CA); Shaun S. Marshall, Port Perry (CA); Kenneth L. Peirce, Gross Pointe Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 52 days.

(21) Appl. No.: 14/084,495

(22) Filed: Nov. 19, 2013

(65) Prior Publication Data
US 2014/0169564 A1   Jun. 19, 2014

Related U.S. Application Data

(60) Provisional application No. 61/737,615, filed on Dec. 14, 2012.

(51) Int. Cl.
*H04K 1/00* (2006.01)
*G07C 9/00* (2006.01)
(52) U.S. Cl.
CPC ........ *G07C 9/00571* (2013.01); *G07C 9/00309* (2013.01); *G07C 2009/00412* (2013.01); *G07C 2009/00476* (2013.01); *G07C 2009/00865* (2013.01)

(58) Field of Classification Search
USPC ........................................................ 380/270
See application file for complete search history.

(56) References Cited

U.S. PATENT DOCUMENTS

| | | | |
|---|---|---|---|
| 2005/0215200 A1* | 9/2005 | Oesterling | 455/66.1 |
| 2006/0276186 A1* | 12/2006 | Hamamura et al. | 455/420 |
| 2007/0094503 A1* | 4/2007 | Ramakrishna | 713/172 |
| 2011/0035120 A1* | 2/2011 | Taylor et al. | 701/49 |
| 2011/0158084 A1* | 6/2011 | Lei et al. | 370/225 |
| 2011/0170532 A1* | 7/2011 | Tchepnda et al. | 370/338 |
| 2012/0159170 A1* | 6/2012 | Lee et al. | 713/169 |
| 2013/0318249 A1* | 11/2013 | McDonough et al. | 709/228 |
| 2014/0079217 A1* | 3/2014 | Bai et al. | 380/270 |

* cited by examiner

*Primary Examiner* — Amare F Tabor
(74) *Attorney, Agent, or Firm* — Ingrassia Fisher & Lorenz, P.C.

(57) ABSTRACT

A system is provided that includes a wireless communication device (or end device), a vehicle having a central module, and a key provisioning server. The key provisioning server is communicatively coupled to the wireless communication device and the central module via wireless connections. The central module can establish a wireless connection with the wireless communication device to initiate a current communication session. When the wireless connection is established with the central module, the wireless communication device communicates a request message to request temporary security information (e.g., public key and/or a digital certificate). The key provisioning server can then provide, in response to the request message, the temporary security information to the wireless communication device and/or the central module. The temporary security information can then be used to encrypt communications between the wireless communication device and the central module.

20 Claims, 12 Drawing Sheets

METHOD AND SYSTEM FOR SECURE AND AUTHORIZED COMMUNICATION BETWEEN A VEHICLE AND WIRELESS COMMUNICATION DEVICES OR KEY FOBS

TECHNICAL FIELD

The technical field generally relates to vehicles, and more particularly relates to Passive Entry Passive Start (PEPS) systems and secure and authorized communication between wireless communication devices or key fobs and a vehicle.

BACKGROUND

A passive entry passive start system allows a driver, or anyone who possesses an authorized key fob, to unlock a vehicle's doors as they approach the vehicle without touching a key fob. Once the key fob is within range of the vehicle e.g., 1 m) locked doors can be open by pulling a door handle. In addition, some PEPS systems can be configured to automatically start the vehicle's engine as an authorized key fob approaches the vehicle. Other PEPS systems require that the driver pushes an ignition button to start and/or stop the vehicle engine.

PEPS systems typically require multiple low frequency (LF) (e.g., 125 kHz) transmitting antennas both inside and outside the vehicle. External antennas can be located in the door handles. In one PEPS system, the key fob detects the low-power signal emitted from the vehicle, and automatically responds by emitting a key code or other identifier. A receiver in the vehicle receives the key code (or other identifier) and sends it to an electronic control unit (ECU). If the key code (or other identifier) is confirmed, the key fob is "authorized," and the ECU unlocks the doors when the driver touches or pulls on a door handle. To start the vehicle engine, the driver simply pushes an ignition button. The ECU allows the engine to start only when the key fob is detected within the cabin of the vehicle and the key code is confirmed again.

Integration of these antennas and other hardware and wiring needed to implement a PEPS system is costly, and it is always desirable to reduce the cost of vehicles that include such PEPS systems.

A typical PEPS system employs a key fob that communicates with a central module located in the vehicle. However, in some cases, the key fob is unavailable or does not work. For example, the driver can lose their key fob, or inadvertently lock it in their vehicle. In addition, the key fob authorization process requires that the key fob is operable and can communicate with the vehicle. In such cases, it would be desirable to provide a backup method of unlocking and starting the vehicle. Stated differently, it would be desirable to provide alternatives to always having to use a key fob in a PEPS system.

The security of communications between a key fob and a vehicle is relatively strong. The key fob is programmed with a unique key when it is manufactured, and is then paired with the vehicle either during manufacturing or at the dealership. The programming is done out of band using a special programming device that outsiders do not have access to. In addition, the key fob has its own unique Bluetooth address that does not change. Further, the key fob does not run software that allows it to communicate with other devices (aside from the programming device and the vehicle).

However, when a wireless communication device, such as a smart phone, is used in place of the key fob as part of a PEPS system, additional security risks arise that would not be a concern when the key fob is used. A unique key stored at the wireless communication device could be accessed using a number of different hacking techniques. Once someone has access to the unique key, they can use it to communicate with the vehicle as if they were authorized to do so. This could allow someone to gain access to the vehicle.

In addition, some alternative PEPS systems are insecure and susceptible to relay station attacks. In some cases, the vehicle can be unlocked and/or started without the driver intending to allow the same. As such, it would be desirable to provide more secure PEPS systems that employ more sophisticated security mechanisms.

Accordingly, it is desirable to improved PEPS systems that can help resolve one or more of the drawbacks mentioned above. For instance, it would be desirable to provide a PEPS system that provides improved security with respect to communications between a vehicle and a wireless communication device, such as a smart phone. Furthermore, other desirable features and characteristics of the present invention will become apparent from the subsequent detailed description and the appended claims, taken in conjunction with the accompanying drawings and the foregoing technical field and background.

SUMMARY

It would be desirable to provide a system that provides improved security with respect to communications between a vehicle and a wireless communication device, such as a smart phone.

A system is provided that includes a wireless communication device (also referred to herein as an end device), a vehicle having a central module, and a key provisioning server. The key provisioning server is communicatively coupled to the wireless communication device and the central module via wireless connections. The central module can establish a wireless connection with the wireless communication device to initiate a current communication session. When the wireless connection is established with the central module, the wireless communication device communicates a request message to request temporary security information (e.g., public key and/or a digital certificate). The key provisioning server can then provide, in response to the request message, the temporary security information to the wireless communication device and/or the central module. The temporary security information can then be used to encrypt communications between the wireless communication device and the central module.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
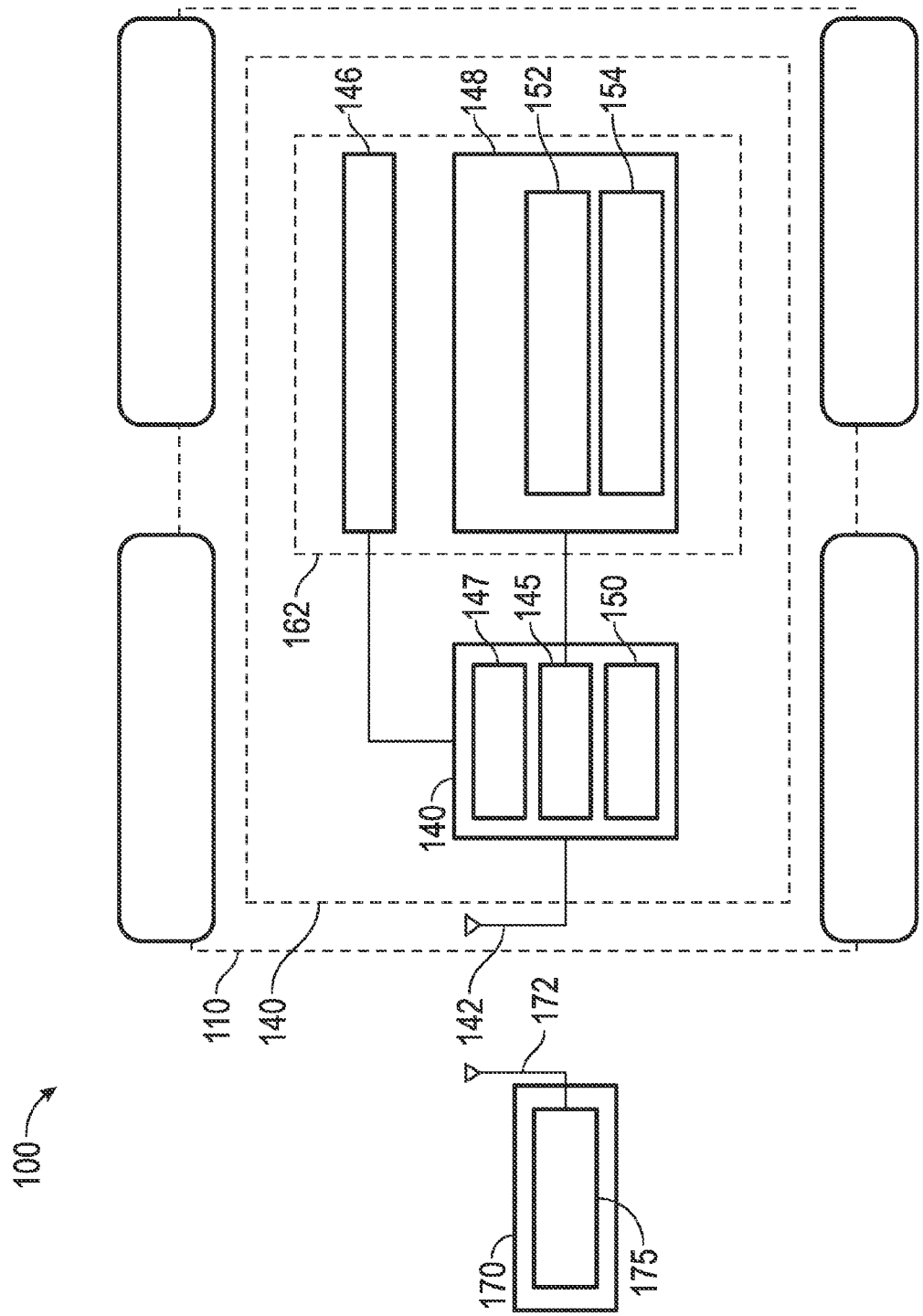
FIG. 1 is a block diagram that illustrates a system that includes a vehicle and an end device in accordance with the disclosed embodiments.

FIG. 1 illustrates a system 100 that includes a vehicle 110 and an end device 170 in accordance with the disclosed embodiments.

The end device 170 is a Bluetooth-enabled device. The end device 170 includes a Bluetooth antenna 172 and a Bluetooth chipset 175, and is capable of implementing all known Bluetooth standards and protocols including a Bluetooth Low Energy (BLE) protocol. Bluetooth technical specifications are developed and published by the Bluetooth Special Interest Group (SIG). Bluetooth Core Specification Version 4.0, adopted Jun. 30, 2010, Core Specification Supplement (CSS) v1 adopted Dec. 27, 2011, Core Specification Addendum (CSA) 2 adopted Dec. 27, 2011, Core Specification Supplement (CSS) v2 adopted Jul. 24, 2012, and Core Specification Addendum (CSA) 3 adopted Jul. 24, 2012, describe various features of the BLE standards, and are incorporated by reference herein in their entirety. Copies of any of the incorporated Core Specifications, including the Bluetooth Specification Version 4.0, can be obtained from the Bluetooth Special Interest Group (SIG) by contacting them in writing at Bluetooth Special Interest Group, 5209 Lake Washington Blvd NE, Suite 350, Kirkland, Wash. 98033, USA, or by visiting their website and downloading a copy. Bluetooth Core Specification Version 4.0 includes Classic Bluetooth, Bluetooth High Speed (HS) protocols and Bluetooth Low Energy (BLE).

Without limitation, the end device 170 may be any Bluetooth enabled communications device such as a smart phone or other cellular phone, laptop or palmtop computer, tablet computer, a PDA, a Bluetooth enabled remote controller, token, a key fob, a watch, a gaming pad, an entertainment device or any other Bluetooth enabled device. Further, it is noted that the end device 170 can actually be multiple different devices in some implementations (e.g., a key fob and a Bluetooth enabled communication device such as a smart phone). As such, if a driver has a Bluetooth enabled smart phone and a Bluetooth enabled key fob with them, the system can process signal strength information from each of those devices independently to determine the proximity of the driver to the vehicle. This is also useful in situations where one of the devices is not available (e.g., is lost, out of power, does not work) since it provides a backup. For example, in one situation, the Bluetooth enabled smart phone could be dead, but the driver may have their key fob with them, or vice-versa. In another situation, the driver may have accidentally locked their key fob in the car and only has a smart phone with them.

The vehicle 110 includes a plurality of in-vehicle modules 140 that perform various management and control functions.

In-Vehicle Modules

Referring again to the particular embodiment that is illustrated in FIG. 1, the in-vehicle modules 140 include: a central module 144 and an electronic control unit (ECU) 162.

The central module 144 includes a Bluetooth chipset 145, an end device authentication and authorization module 147, and an end device approach detection module 150. In accordance with some of the disclosed embodiments, the central module 144 can be implemented within an infotainment module or telematics module. One advantage of implementing the central module 144 within the infotainment module or the telematics module is that either one of these modules typically already have a Bluetooth chipset and therefore there is no need to provide an additional dedicated Bluetooth chipset for use by the central module 144. In one embodiment, the central module 144 dynamically and randomly generates a new Bluetooth address for the end device 170 at the end of each driving cycle. The new Bluetooth address for the end device 170 can be used by the central module 144 to identify and authenticate the end device 170.

The ECU 162 can include other in-vehicle modules including, but not limited to, a tire pressure management module 146, and a passive entry passive start (PEPS) system control module 148. The PEPS system control module 148 includes a remote actuation module 152 and a body control module 154. The in-vehicle modules 140 are illustrated as being grouped in a single box that delineates the in-vehicle modules 140; however, it is noted that the in-vehicle modules 140 can be distributed within the vehicle 110 and can communicate with each other over one or more buses.

The end device 170, central module 144 and ECU 162 are used to provide a passive entry passive start (PEPS) system for performing at least one passive entry passive start (PEPS)

function with respect to a vehicle as the end device 170 (e.g., smart phone or key fob, etc.) approaches the vehicle and meets authorization criteria.

To do so, the central module 144 can be communicatively coupled to the end device 170 via Bluetooth wireless connections (e.g., Bluetooth low energy (BLE) wireless connections). The end device 170 communicates with the central module 144 in accordance with a Bluetooth communication protocol. In addition, the end device 170 has various applications on it such as a passive entry passive start (PEPS) application program (illustrated in FIG. 2 by reference number 201) that allows it to provide information and generate commands as part of a PEPS system in conjunction with the passive entry passive start system control module 148 that is located within the vehicle.

In some embodiments, the central module 144 can perform a filtered scan for advertisement messages transmitted from the end device 170 over an advertising channel.

The central module 144 can determine the distance of the end device 170 from the vehicle based on the signal strength information from reporting messages received from the end device 170.

Based on the distance of the end device 170 from the vehicle the central module 144 can then determine whether the end device is within range for authorization. Thus, signal strength information can be used to determine proximity to the vehicle. In some embodiments, when the end device is determined to be within range for authorization, the central module 144 can initiate an authorization process with the end device 170 by exchanging messages over a data channel with the end device, and then control performance of at least one passive entry passive start (PEPS) function at the vehicle 100. For instance, in one embodiment, the central module 144 can perform a challenge/response and send results to BCM. Here, it will be determined if the end device 170 is authorized for vehicle entry.

For example, in some embodiments, when it's determined that the end device 170 is close enough to the vehicle 110, the PEPS functions are performed (e.g., the doors are unlocked, engine is started, etc.). When it's determined that the end device 170 is too far from the vehicle 110 the PEPS system remains inactivated and the doors remain locked.

In addition, in accordance with some of the disclosed embodiments, the central module 144 also includes an authentication and authorization module 147 that can perform authentication and/or authorization mechanisms that are described in any of the Bluetooth communication standards that are referenced herein, as well as other authentication and/or authorization mechanisms that are not described in the Bluetooth standards. As such, the authorization and authentication module 147 can receive signals transmitted from the end device 170 and perform authorization and/or authentication of the end device 170. When the end device 170 has been authorized and/or authenticated this allows the end device 170 to act as a controller for the some of the in-vehicle modules 140. Depending on the implementation this control can be performed automatically or at the command of a user who possesses the end device 170.

As noted above, in one implementation, the central module 144 and the end device 170 can each include Bluetooth chipsets 145/175. Some features of one implementation of the Bluetooth chipsets will now be described below with reference to FIG. 2.

Figure 2:
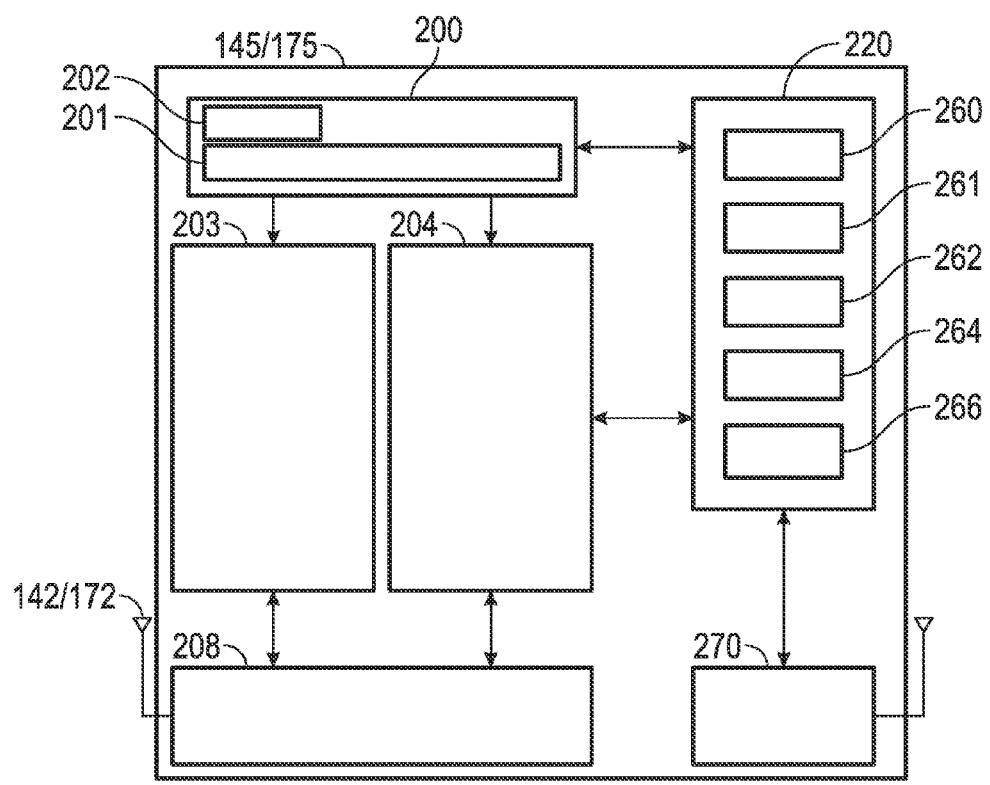
FIG. 2 is a simplified block diagram that illustrates an example of a Bluetooth chipset and a Bluetooth antenna that can be implemented at the combined function sensor device, the central module, and/or the end device in accordance with some of the disclosed embodiments.

FIG. 2 is a block diagram that illustrates an example of a Bluetooth chipset 145/175 and a Bluetooth antenna 142/172 that can be implemented at the central module 144, and/or the end device 170 in accordance with some of non-limiting examples of the disclosed embodiments.

The Bluetooth chipset 145/175 includes application programs 200, a Bluetooth Low Energy (BLE) protocol stack 203, an optional Bluetooth Basic Rate (BR)/Enhanced Data Rate (EDR) protocol stack 204, a Bluetooth radio transceiver 208, a processor 220 that includes, for example, a central processing unit (CPU), such as a dual core central processing unit (CPU) 260 and 261 (or any other multicore CPU having any number of processor cores), a random access memory (RAM) 262, a read only memory (ROM) 264, and interface circuits 266 to interface with Bluetooth radio transceiver 208. The RAM 262 and ROM 264 may be implemented using any known type of semiconductor memory.

Any of the Bluetooth chipsets 145/175 described herein can be either a single mode device or a dual mode device depending on the implementation.

A single mode Bluetooth chipset is a BLE-only chipset that is optimized for ultra-low power operation, and that can communicate with other single mode Bluetooth chipsets and dual-mode Bluetooth chipsets when the latter are using the BLE technology part of their architecture to transmit and receive. Single-mode chips can operate for long periods (months or even years) using a coin cell battery (e.g., a 3V, 220 mAh CR2032).

By contrast, Dual-Mode Bluetooth chipsets are also capable of communicating with Classic Bluetooth technology and other dual-mode chipsets using a conventional Bluetooth architecture. Dual-Mode Bluetooth chipsets are capable of communicating with all the legacy Classic Bluetooth devices as well as BLE devices. However, because they are required to perform Classic Bluetooth and BLE duties, dual-mode chips are not optimized for ULP operation to the same degree as single-mode devices. Rather, Classic Bluetooth technology and BLE dual mode devices typically require the capacity of at least two AAA cells (which have 10 to 12 times the capacity of a coin cell and much higher peak current tolerance), and often more, to power them for days or weeks (depending on the application).

As such, the Bluetooth chipset 145/175 includes at least a Bluetooth Low Energy (BLE) protocol stack 203, and in some implementations, may also include a Bluetooth BR/EDR protocol stack 204.

The BLE protocol stack 203 is described in the Bluetooth Core Specification, Version 4.0 protocol specification, which is incorporated by reference herein in its entirety. The BLE protocol stack 203 is optimized for occasional connections that allow for longer sleep times between connections, small data transfers, very low duty cycles and simpler topology than Classic Bluetooth devices. Some characteristics of BLE technology that underlie help achieve ultra-low power (ULP) performance are maximized standby time, fast connection, and low peak transmit/receive power. Classic Bluetooth employs a "connection oriented" radio with a fixed connection interval. In contrast, BLE technology employs a variable connection interval that can be set from a few milliseconds to several seconds depending on the application. In addition, because it features a very rapid connection, BLE technology can normally be in a connectionless state where the two ends of a link are aware of each other, but link up only when absolutely necessary and then for as short a time as possible. This connectionless operational mode of BLE technology ideally suits transmission of data where fully asynchronous communication can be used to communicate send low volumes of data infrequently.

In some implementations, any or all of the Bluetooth chipsets 145/175 may also include a Bluetooth BR/EDR protocol stack 204, which is described in the Bluetooth Specification version 3.0+HS, which is incorporated by reference herein in its entirety.

The Bluetooth protocol stacks 203 and 204 and/or application programs 200 may be embodied as program logic stored in the RAM 262 and/or ROM 264 in the form of sequences of programmed instructions which, when executed in the CPUs 260 and/or 261, carry out at least some of the functions of the disclosed embodiments. The program logic may be delivered to the RAM 262 or ROM 264 from a computer program product in the form of computer-usable media such as resident memory devices, smart cards or other removable memory devices. Alternately, they may be embodied as integrated circuit logic in the form of programmed logic arrays or custom designed application specific integrated circuits (ASICs). In some implementations, the program logic may be downloaded from such computer readable media to be stored, for example, in the RAM 262 or programmable ROM 264 for execution by the CPUs 260 and/or 261.

The Bluetooth radio 208 may include separate transceiver circuits, or alternately, the radio 208 may be a single radio module capable of handling one or multiple channels in a high speed, time and frequency multiplexed manner.

The other radio 270 may be any of a variety of wireless personal area, wireless local area, or wireless wide area radio devices that are known in the art. The other radio 270 can be a radio that is capable of communicating in a cellular radio network. The other radio 270 can include a cellular interface that can utilize any one of a number of different multiple access techniques such as Frequency Division Multiplexing (FDM), Time Division Multiplexing (TDM), Code Division Multiplexing (CDM), and others. Examples of multiple access schemes which can be used can include any one or more of time division multiple access (TDMA), direct sequence or frequency hopping code division multiple access (CDMA), Global System for Mobile communication (GSM), Wide-band CDMA (WCDMA), Universal Mobile Telecommunications System (UMTS), frequency division multiple access (FDMA), orthogonal frequency division multiplexing (OFDM), opportunity division multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof. Moreover, the other radio 270 can support communication in compliance with at least the following communication standards: (1) standards governed by a consortium named "3rd Generation Partnership Project" (3GPP), (2) standards governed by a consortium named "3rd Generation Partnership Project 3" (3GPP2), (3) the high data rate (HDR) system that conforms to the TIA/EIA/IS-856 standard (the IS-856 standard), and (4) other standards.

Further, the other radio 270 can also include WLAN interface that can be, for example, an ad hoc networking air interface that complies with any of the IEEE 802.11 Standards and specifications (e.g., IEEE 802.11(a), (b), (g) or (n)), any of the IEEE 802.16 Standards (e.g., IEEE 802.16e WiMax specifications), or another wireless standard (e.g., IEEE 802.20 Mobile Broadband Wireless Access (MBWA) specifications for IP-based services).

Finally, the application programs 200 can include, among other things, a PEPS system control module 201, and a security module 202 that can be used to perform any of the security related tasks described below.

Overview of Public-key Cryptography and Digital Certificates

In the description that follows various references will be made to public-key cryptography and digital certificates. Prior to describing the various embodiments with reference to FIGS. 3-12 some general information will be described about public-key cryptography and digital certificates.

Public-key Cryptography

Public-key cryptography refers to a cryptographic system requiring two separate keys: a private key that is secret, and a public key that is not secret. The public key may be published without compromising security, while the private key must not be revealed to anyone not authorized to read the messages. Public-key cryptography uses asymmetric key algorithms (such as RSA), and can also be referred to by the more generic term "asymmetric key cryptography." Public-key cryptography is a fundamental, important, and widely used technology. It is an approach used by many cryptographic algorithms and cryptosystems. There are three primary kinds of public key systems: public key distribution systems, digital signature systems, and public key cryptosystems, which can perform both public key distribution and digital signature services. Diffie-Hellman key exchange is the most widely used public key distribution system, while the Digital Signature Algorithm is the most widely used digital signature system.

The distinguishing technique used in public-key cryptography is the use of asymmetric key algorithms, where the key used to encrypt a message is not the same as the key used to decrypt it. Although different, the two parts of the key pair are mathematically linked. One key locks or encrypts the plaintext, and the other unlocks or decrypts the ciphertext. Neither key can perform both functions by itself. Each user has a pair of cryptographic keys—a public encryption key and a private decryption key. The publicly available encrypting-key is widely distributed, while the private decrypting-key is known only to the recipient. Messages are encrypted with the recipient's public key, and can be decrypted only with the corresponding private key. The keys are related mathematically, but the parameters are chosen so that determining the private key from the public key is either impossible or prohibitively expensive.

Two main uses for public-key cryptography are:

Public-key encryption: In public-key encryption, a message encrypted with a recipient's public key cannot be decrypted by anyone except a possessor of the matching private key. Stated differently, a message that a sender encrypts using the recipient's public key can be decrypted only by the recipient's paired private key. It is presumed that this will be the owner of that key and the person associated with the public key used. This is used to attempt to ensure confidentiality.

Digital signatures: Public-key cryptography can also be used in a digital signature scheme (e.g., for sender authentication and non-repudiation). In a digital signature scheme, a user who wants to send a message computes a digital signature for this message, and then sends this digital signature (together with the message) to the intended receiver. Digital signature schemes have the property that signatures can be computed only with the knowledge of the correct private key. To verify that a message has been signed by a user and has not been modified, the receiver needs to know only the corresponding public key. In a digital signature scheme, authenticity of a message can be checked by creating a digital signature of the message using the private key, which can then be verified by using the public key. ((In many cases, only a hash of the message is typically encrypted for signature verification purposes.)) As such, a message signed with a sender's private key can be verified by anyone who has access to the sender's public key, thereby proving that the sender had access to the private key and, therefore, is likely to be the person associated with the public key used. This also ensures that the message has not been tampered with.

To achieve both authentication and confidentiality, the sender can first sign the message using his private key and then encrypt both the message and the signature using the recipient's public key. These characteristics can be used to construct many other (sometimes surprising) cryptographic protocols and applications, such as digital cash, password-authenticated key agreement, multi-party key agreement, time-stamping services, non-repudiation protocols, etc. In some cases (e.g. RSA), there exist digital signature schemes with many similarities to encryption schemes. In other cases (e.g. DSA), the algorithm does not resemble any encryption scheme.

Public-key infrastructure (PKI)

In a public-key infrastructure (PM), one or more third parties—known as certificate authorities—certify ownership of key pairs.

Digital Certificate

A digital certificate (also known as a public key certificate or identity certificate) is an electronic document that uses a digital signature to bind a public key with an identity (e.g., information such as the name of a person or an organization, their address, and so forth). The certificate can be used to verify that a public key belongs to an individual.

In a typical public key infrastructure (PM) scheme, the signature will be of a certificate authority (CA). In a web of trust scheme, the signature is of either the user (a self-signed certificate) or other users ("endorsements"). In either case, the signatures on a certificate are attestations by the certificate signer that the identity information and the public key belong together.

For provable security this reliance on something external to the system has the consequence that any public key certification scheme has to rely on some special setup assumption, such as the existence of a certificate authority.

More information about cryptography, public-key cryptography, PKI, digital certificates, etc. can be found, for example, in N. Ferguson; B. Schneier (2003). Practical Cryptography. Wiley. ISBN 0-471-22357-3; J. Katz; Y. Lindell (2007). Introduction to Modern Cryptography. CRC Press. ISBN 1-58488-551-3; and A. J. Menezes; P. C. van Oorschot; S. A. Vanstone (1997). Handbook of Applied Cryptography. ISBN 0-8493-8523-7, which are incorporated by reference herein in their entirety.

Key Fob Programming Via Key Provisioning Server

Figure 3:
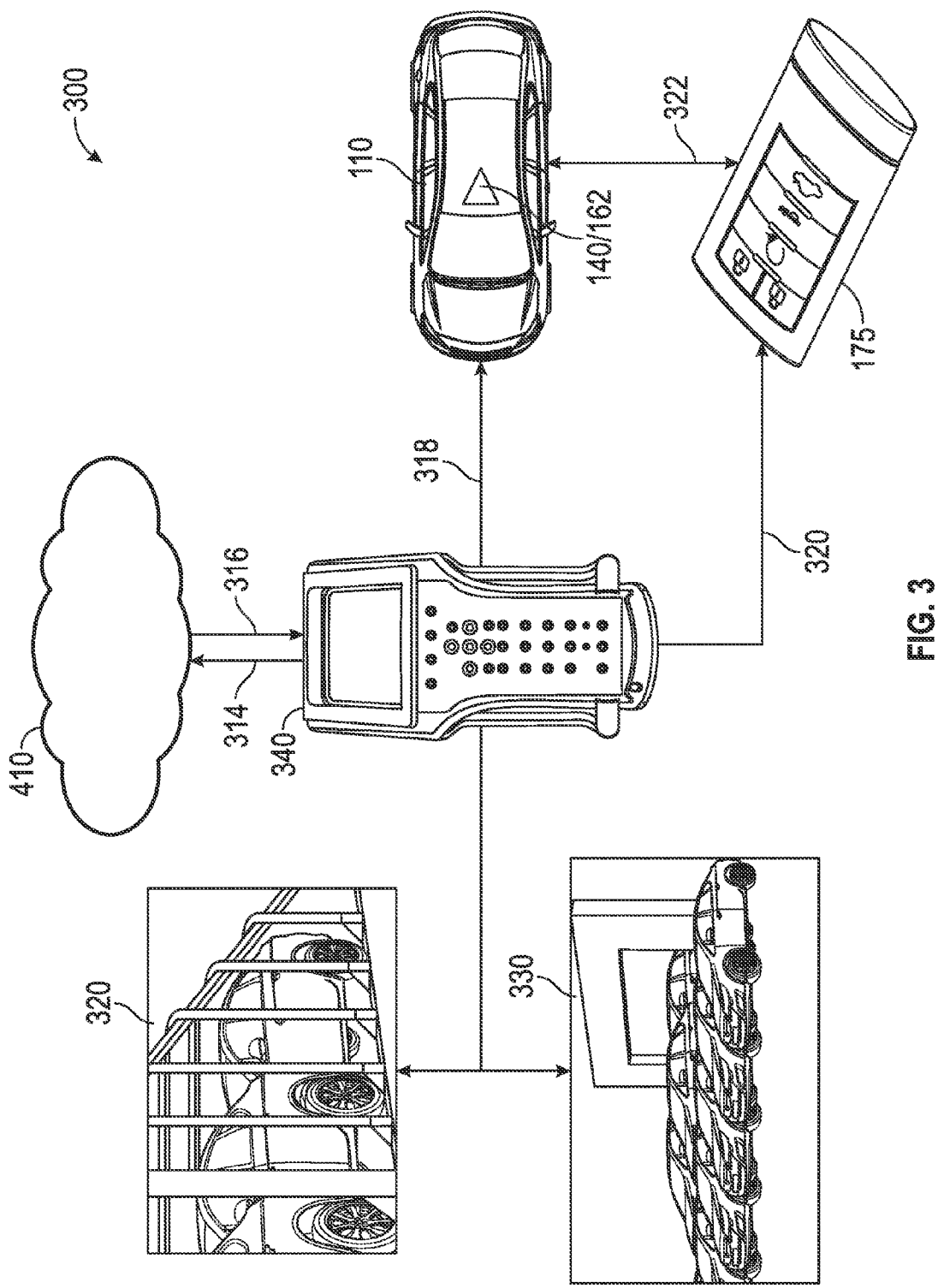
FIG. 3 is a diagram that illustrates a system for distributing a private/public key pair and/or digital certificate to a key fob and vehicle in accordance with the disclosed embodiments.

FIG. 3 is a diagram that illustrates a system 300 for distributing a private/public key pair and/or digital certificate to a key fob 175 and to a central module 140 of a vehicle 110 in accordance with the disclosed embodiments. The system 300 includes a key provisioning server (KPS) 310, a manufacturing plant 320, a vehicle dealership 330, a key fob programming device 340, a vehicle 110, and a key fob 175.

As explained above, the vehicle 110 includes the central module 140 and the ECU module 162.

At 314, the key fob programming device 340 transmits a request message to the KPS 410 to request a public key infrastructure (PKI) private/public key pair and/or a digital certificate. The request message includes the vehicle's vehicle identification number (VIN). The KPS 410 creates new PKI private/public key pair (and/or a digital certificate) and stores it with the VIN. The new PKI private/public key pair will be used to pair end devices (Smartphones, Fob etc.) with the central module 140 during future end device registrations.

At 316, the KPS 410 transmits a response message to the device 340. The response message includes the private/public key pair and/or the digital certificate. At 318, the key fob programming device 340 transmits the private key to the central module 140 of the vehicle 110. The central module 140 can eventually use the private key to encrypt communications sent to the key fob 175 or to decrypt communications received from the key fob 175.

At 320, the key fob programming device 340 transmits the public key (of the PKI private/public key pair) and/or the digital certificate to the key fob 175.

At 322, the key fob 175 can be preprogrammed at the manufacturing plant 320 or the vehicle dealership 330 to pair the key fob 175 with the central module 140 of the vehicle.

Registration of Wireless Communication Device with Key Provisioning Server

Figure 4:
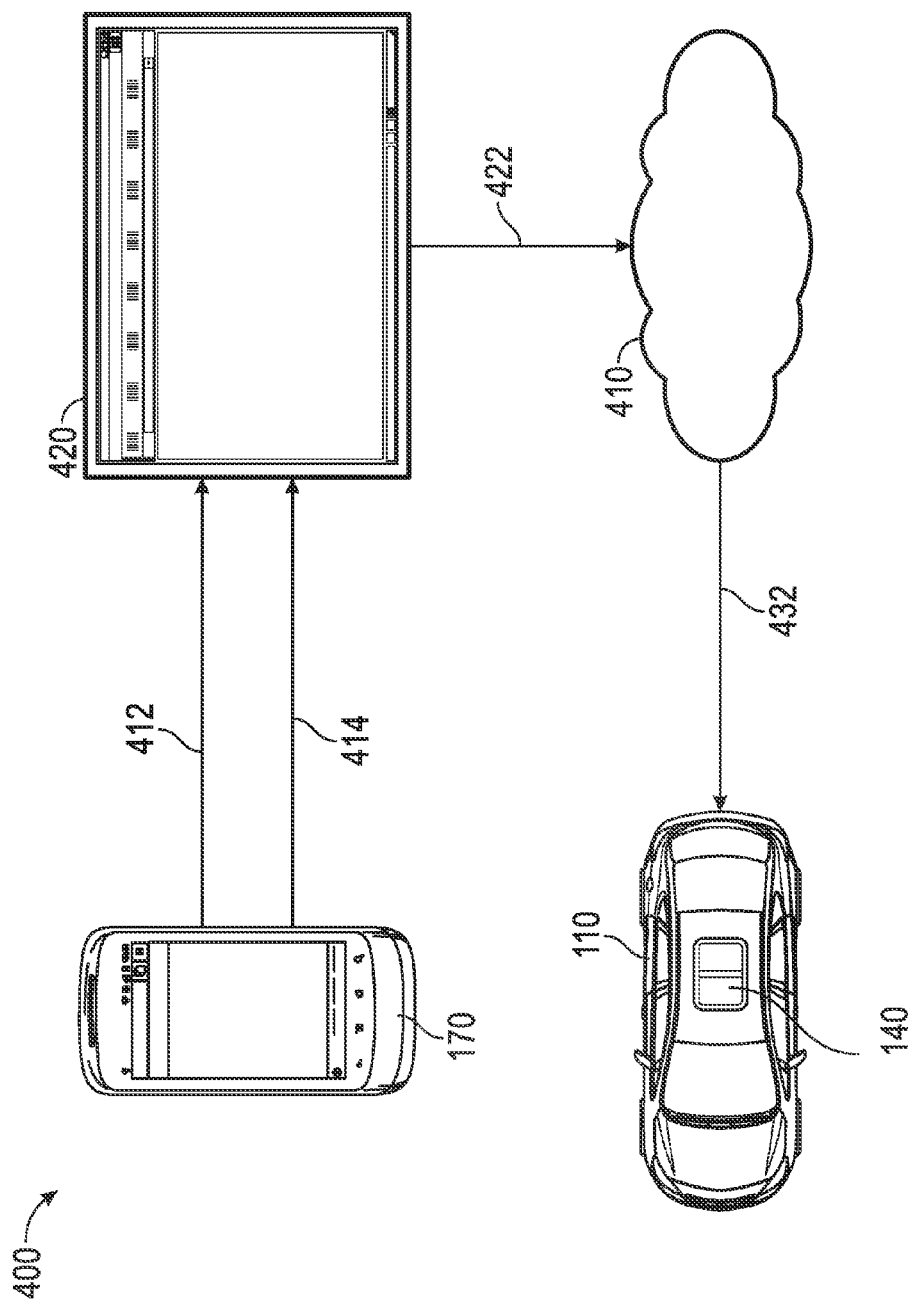
FIG. 4 is a diagram that illustrates the system of FIG. 3 when registering a wireless communication device with a Key Provisioning Server (KPS) and a central module of a vehicle in accordance with the disclosed embodiments.

FIG. 4 is a diagram that illustrates registration of the wireless communication device 170 with the KPS 410 and the central module 140 of FIG. 3 in accordance with the disclosed embodiments. In FIG. 4, block 420 represents a registration website that is accessed via an application at the wireless communication device 170.

When the user of the wireless communication device 170 opens the application a session is started. The wireless communication device 170 communicates message(s) to the KPS 410 at 412 to register the wireless communication device 170 with the KPS 410; this registration information can include an IMEI (or other unique identifier) for the wireless communication device 170. In an alternative embodiment, the registration information can include additional information (e.g., that is unique to the device 170 but is not the IEMI). This can help prevent spoofing and use of malware.

At 414, the user of the wireless communication device 170 inputs a personal identification number (PIN).

At 422, the registration information and the PIN are communicated to the KPS 410, and the KPS 410 stores the registration information along with the PIN. At his point, the PIN number and the IEMI have been registered with the KPS 410.

At 432, the KPS 410 communicates the PIN and an International Mobile Equipment Identity (IMEI) of the wireless communication device 170 to the central module (not illustrated in FIG. 4, but shown as 140 in FIG. 1) of the vehicle 110. The PIN number along with the identifier has been provided to the central module of the vehicle for authorization.

Establishment of Secure Communication Connection Between a Wireless Communication Device and Central Module Using Security Information Provided from a Key Provisioning Server In accordance with the disclosed embodiments, a system and method are provided for secure communication between a wireless communication device (e.g., a smart phone) and a central module of a vehicle.

A description of a system and method for distributing security information a wireless communication device (e.g., a smart phone) and a central module of a vehicle will be described with reference to FIGS. 5-10. In this description, one exemplary implementation will be described where the security information that is distributed will be described as being a public key.

However, in other implementations, the security information can include any other known types of security information, such as keys or certificates, that are commonly used in cryptographic systems.

For example, in another implementation, the security information can be a digital certificate that is signed with a private key.

In other implementations, a combination of these different types of security information can be distributed and used to secure communications between a wireless communication device (e.g., a smart phone) and a central module of a vehicle once the wireless communication device is determined to be within an authorization range. For instance, in one implementation, the security information can include both a public key and a digital certificate signed with a private key.

Figure 5:
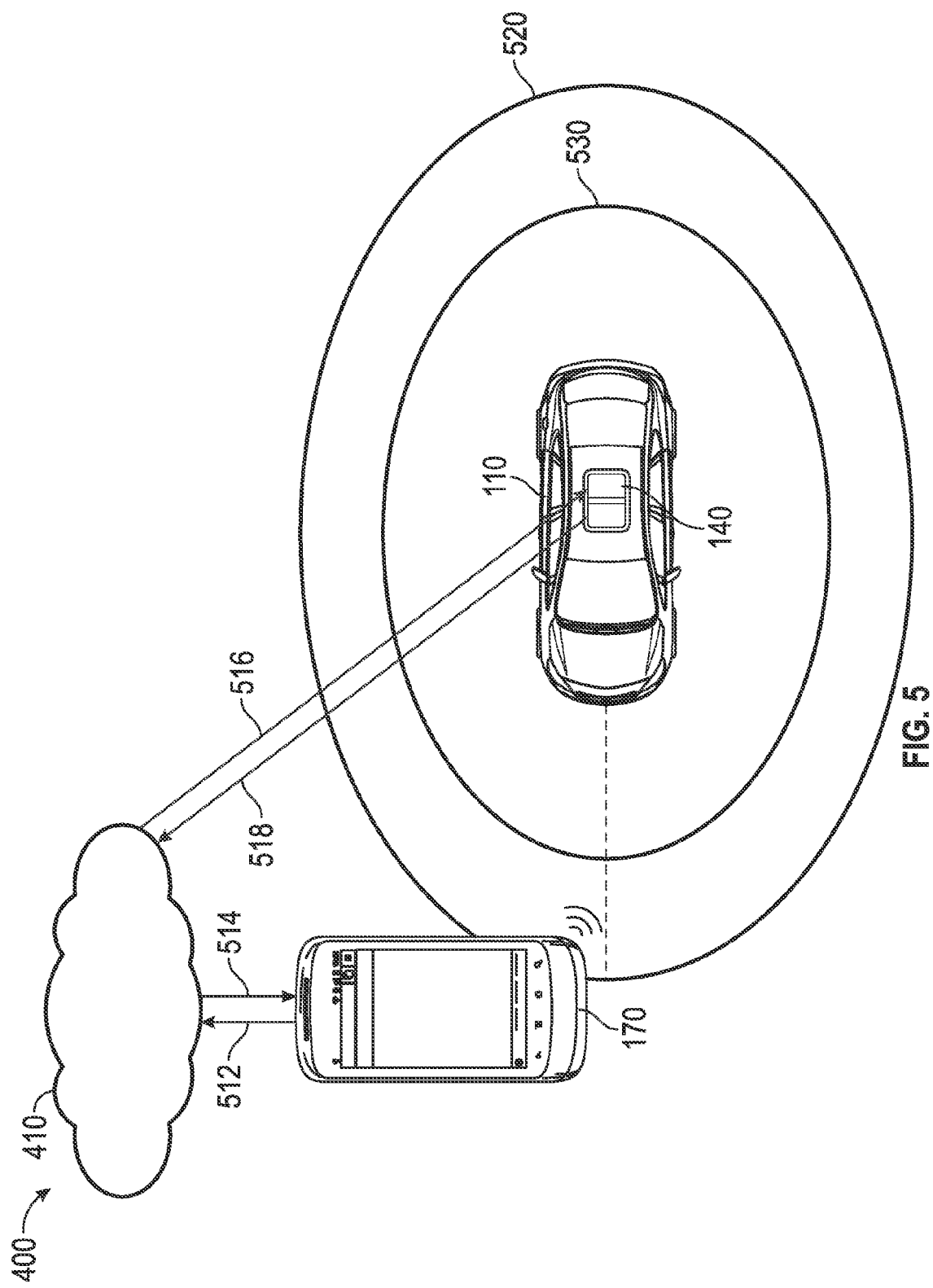
FIG. 5 is a diagram that illustrates the system of FIG. 3 when the wireless communication device approaches the vehicle, comes within a Bluetooth advertising range, and request a new public key in accordance with the disclosed embodiments.

FIG. 5 is a diagram that illustrates the system 400 of FIG. 3 when the wireless communication device 170 approaches the vehicle 110.

When the wireless communication device 170 comes within a Bluetooth advertising range of the vehicle, the wireless communication device communicates a request message to the KPS 410 to request a new public key that can be used during a new session with the central module of the vehicle 110. To explain further, when the wireless communication device 170 approaches the vehicle 110 and comes within a Bluetooth advertising range 520 (e.g., approximately 100 meters in one implementation), a security module at the wireless communication device 170 attempts to start a new secure communication session by transmitting (at 512) a request message to a key provisioning server (KPS) 410 to request a new public key. This request message includes a request for a new public key to use during that new secure communication session with the central module 140 of the vehicle 110. A different, new public key (or other security information) can be requested for each session. In addition, in some implementations, once a secure connection has been established with the KPS 410, the KPS 410 can send other security information, such as an encryption key, to the wireless communication device 170 that can also be used to encrypt communications between the wireless communication device 170 and the central module 140.

The KPS 410 responds by generating the new public key and communicating a response message 514 back to the wireless communication device 170. This response message includes the new public key. The KPS 410 also communicates a message to the central module 140 of the vehicle 110 (at 516) to provide the public key to the central module 140 and lets the central module 140 know that a new session has been established and that the public key has been provided to the wireless communication device 170. The central module 140 then communicates a response message to the KPS 410 at 518 to acknowledge that the session has been established.

Notably, this new (temporary) public key is to be used only for that particular communication session between the wireless communication device 170 and the central module 140. A request/response exchange 512, 514 is performed between the wireless communication device 170 and KPS 410 each time a new secure communication session is to begin between the wireless communication device 170 and the central module 140 of the vehicle 110.

Figure 6:
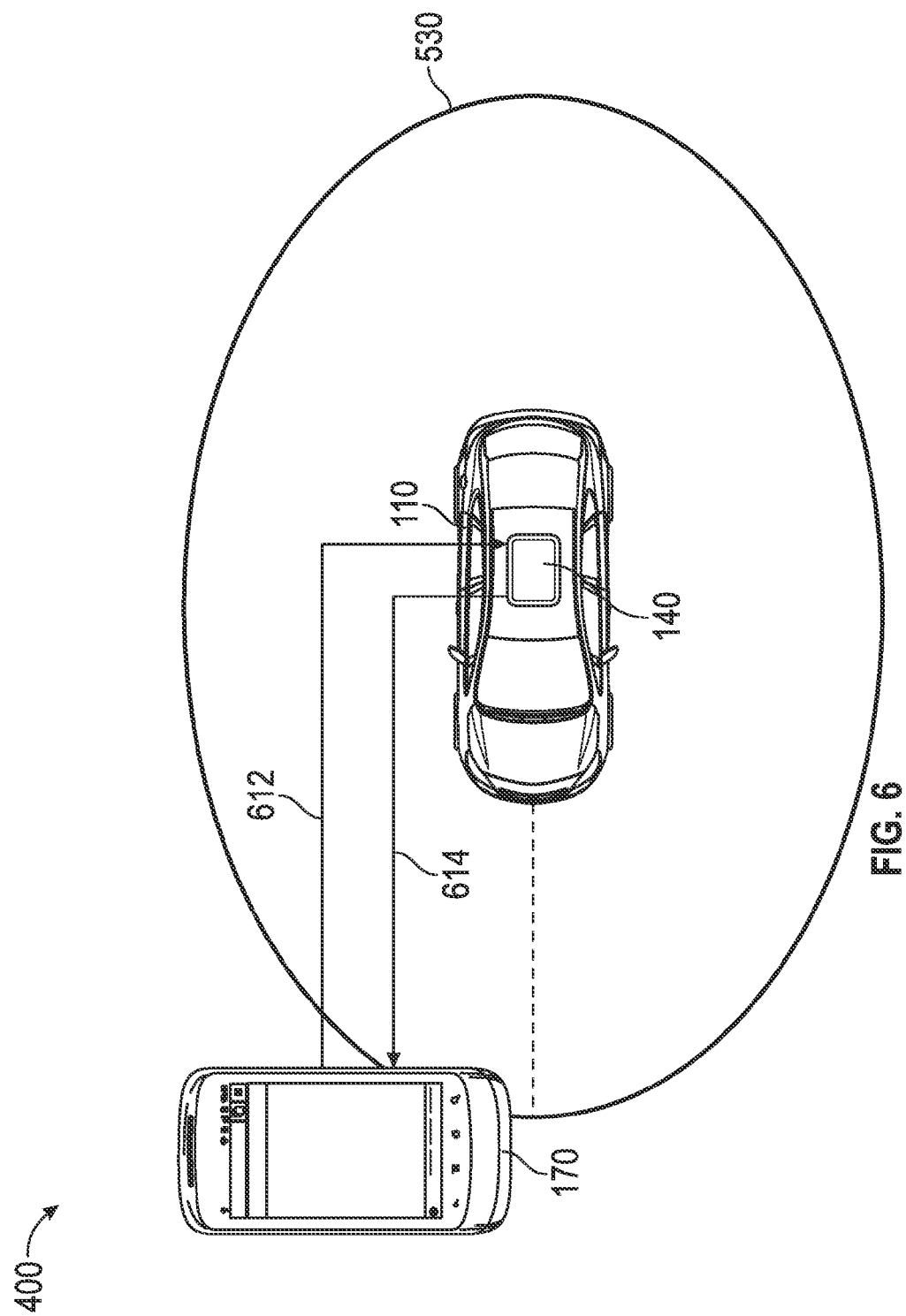
FIG. 6 illustrates establishment of a secure communication channel between the wireless communication device and the central module of the vehicle when the wireless communication device comes within an authorization range of the vehicle that is required for establishment of an authorized connection in accordance with the disclosed embodiments.

FIG. 6 is a diagram that illustrates establishment of a secure and authorized communication channel between the wireless communication device 170 and the central module 140 of FIG. 3 in accordance with the disclosed embodiments.

After obtaining the new public key, when the wireless communication device 170 comes within an authorization range of the vehicle 110, at 612, the wireless communication device 170 can transmit a connection request message to the central module 140 to attempt to establish an authorized connection. As used herein, the term "authorization range" refers to a distance that the wireless communication device 170 must be within with respect to the central module 140 to establish an authorized connection with a central module 140 of the vehicle. In one implementation, the authorization range is approximately five meters. The central module 140 can determine whether the wireless communication device 170 is within the authorization range using any of the proximity detection techniques described above.

The connection request message communicated at 612 is encrypted using the public key that was provided to the wireless communication device at 514 of FIG. 5.

In response to the connection request message, at 614, the central module 140 communicates a connection response message to the wireless communication device 170. The connection response message is encrypted with a private key (that was downloaded to the central module 140 from the KPS 410 and programmed into the central module 140 at 318 of FIG. 3), and is used to establish an authorized connection with the wireless communication device 170.

For any subsequent communications, during that particular communication session, the new public key can be used by the wireless communication device 170 and the central module 140 to encrypt and/or decrypt information communicated between those two entities 170, 140. Notably, the new public key is used only for that session and is not stored in memory at the wireless communication device. When that particular communication session ends (e.g., is closed), the most recently obtained public key is no longer valid and cannot be used to protect communications between the two entities 140, 170 unless additional authentication is performed using the PIN of the wireless communication device 170. This way, when the communication session ends (e.g., if the wireless communication device moves out of the Bluetooth advertising range 520 of the vehicle while the session is active), in some embodiments, the public key is can be temporarily stored in memory at the wireless communication device 170 for use when no connection can be established with the KPS 410, as will now be described below.

Secure Establishment of an Authorized Connection Between Wireless Communication Device and Central Module when there is no Connection to Key Provisioning Server In accordance with some of the other disclosed embodiments, when the wireless communication device (and/or vehicle) cannot connect to the KPS (e.g., no data or Internet connection is available), other mechanisms are provided to ensure that the wireless communication device 170 and the central module 140 can still communicate in a secure manner. This way, a backup method can be provided when no connection to the KPS is available. For instance, in one embodiment, when the wireless communication device detects that it is no longer able to connect to the KPS 410, the public key (for the most recent session) can be temporarily stored in memory. A security module application at the wireless communication device will prompt the user to manually enter a pre-registered personal identification number (PIN) into the wireless communication device 170. The wireless communication device 170 and the central module 140 can then use this PIN, along with the previous or "most recently obtained" public key (that is stored in memory), to encrypt or decrypt information communicated between the wireless communication device and the central module during that session. Further details will now be described below with reference to FIGS. 7-10.

Figure 7:
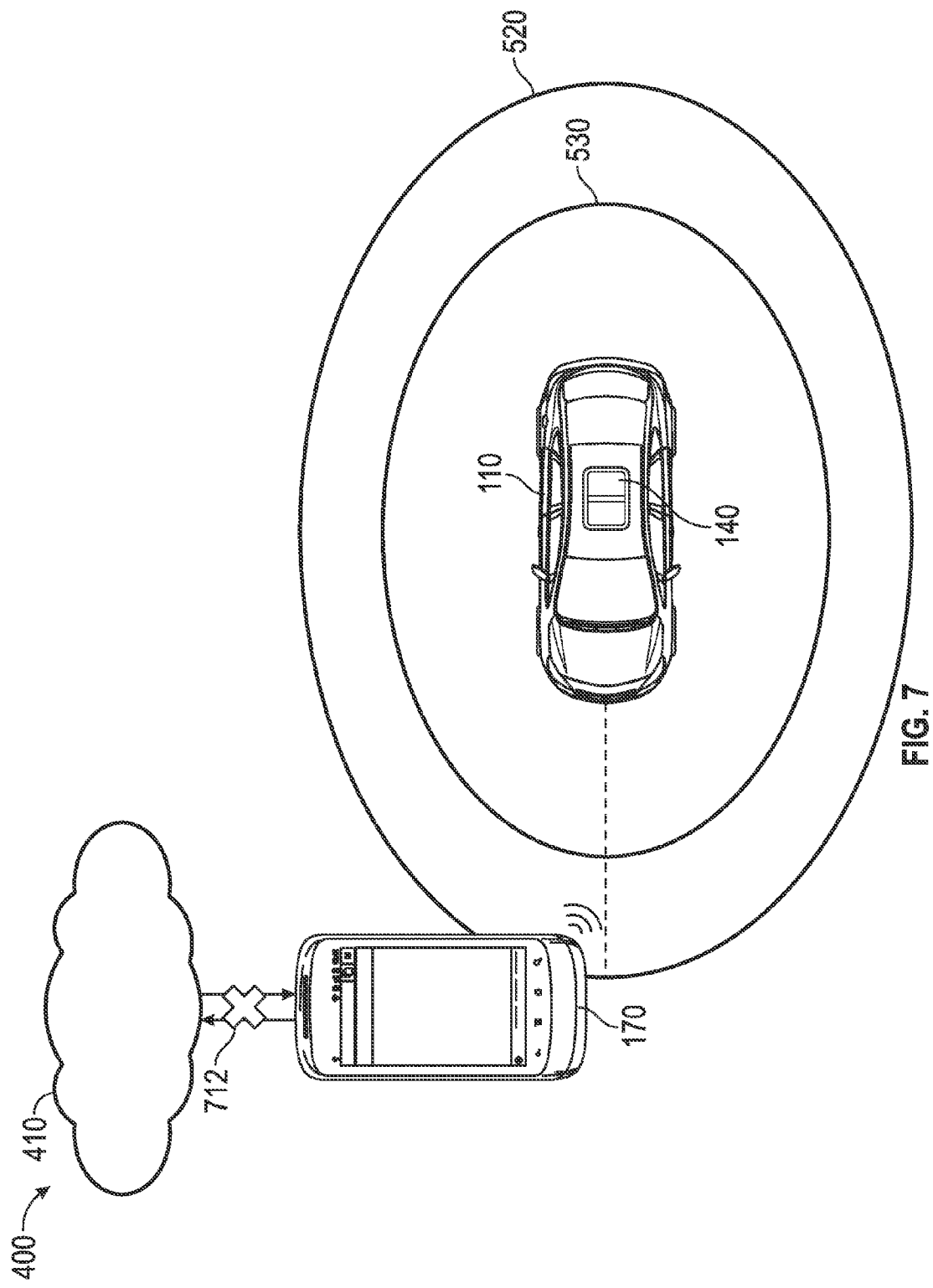
FIG. 7 illustrates a scenario where the wireless communication device is unable to establish a connection to the KPS to retrieve a new public key in accordance with the disclosed embodiments.

FIG. 7 illustrates a scenario where the wireless communication device 170 is within Bluetooth advertising range 520, but unable to establish a connection to the KPS 410 (at 712) to retrieve a new public key. Here, the wireless communication device 170 attempts to establish a new session but is unable to connect to the KPS 410. It would be desirable for the wireless communication device 170 to be able to continue to communicate with central module 140 even though there is no way for the wireless communication device 170 to retrieve a new public ley that would normally be needed to start a new, secure communication session.

Figure 8:
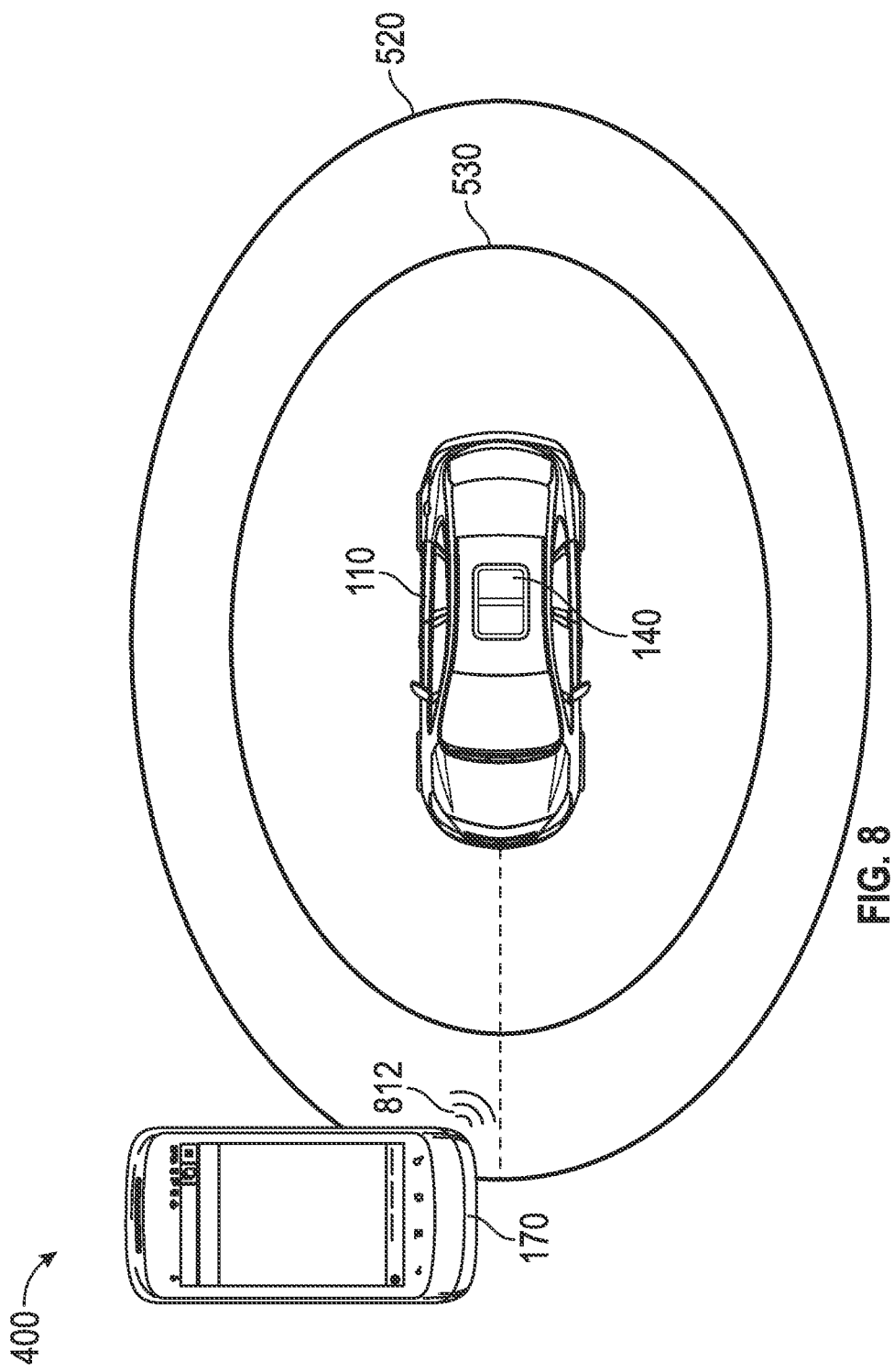
FIG. 8 illustrates a method for establishment of a secure communication channel between the wireless communication device and the central module of the vehicle when the wireless communication device is unable to establish a connection to the KPS to retrieve a new public key in accordance with the disclosed embodiments.

FIG. 8 illustrates a method for establishment of a secure communication channel between the wireless communication device 170 and the central module 140 of the vehicle 110 when the wireless communication device 170 is unable to establish a connection to the KPS 410 to retrieve a new public key. When the wireless communication device 170 comes within Bluetooth advertising range 520 (e.g., approximately 100 meters in one implementation) of the vehicle 110, and is unable to connect to the KPS 410, the user of the wireless communication device 170 will be prompted to enter a pre-registered PIN. In some embodiments, the security module application that runs on the wireless communication device randomly changes the locations of the number buttons on the user interface so that the pre-registered PIN cannot be determined.

Figure 9:
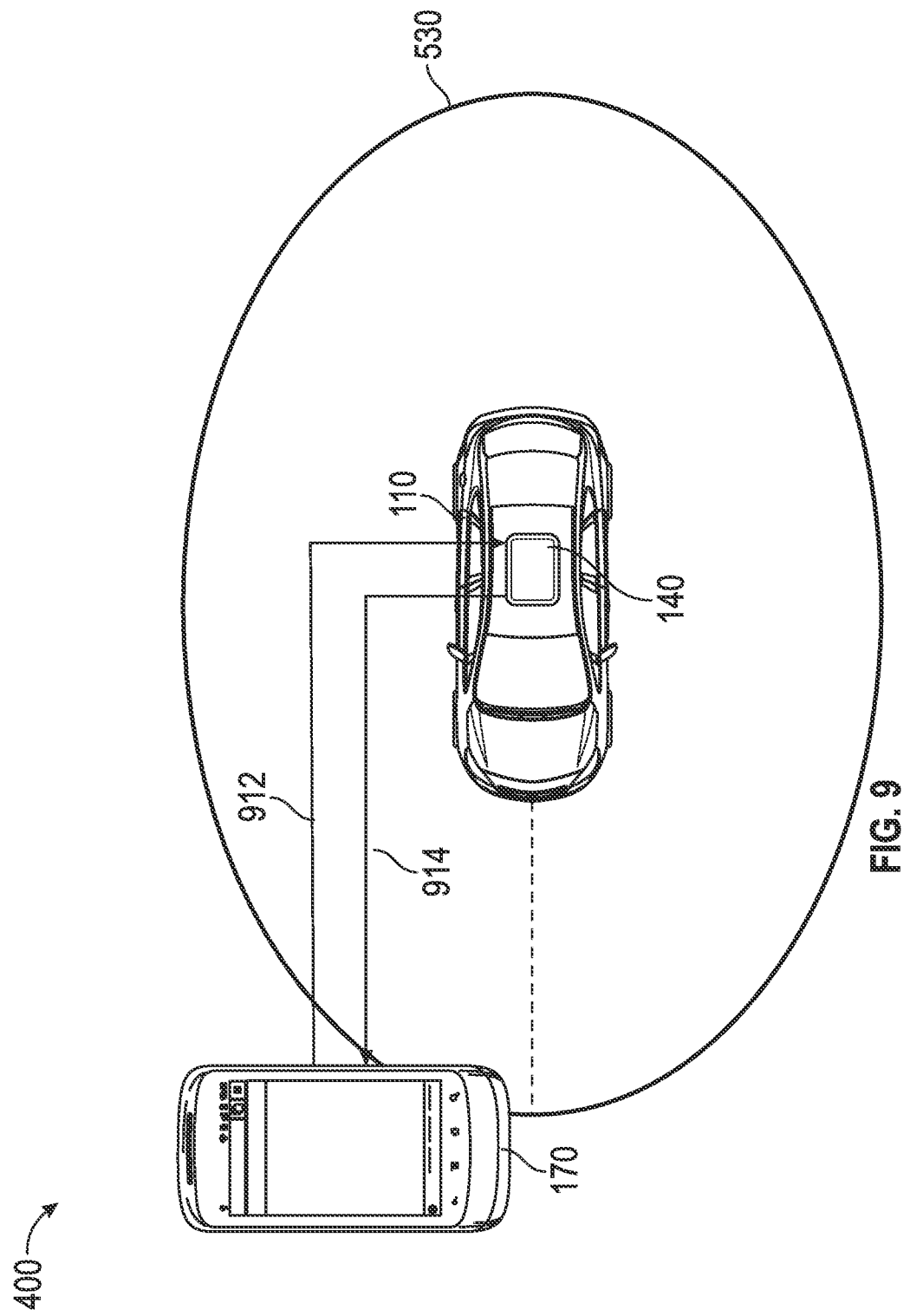
FIG. 9 illustrates establishment of a secure communication channel between the wireless communication device and the central module of the vehicle when the wireless communication device comes within the authorization range of the vehicle in accordance with the disclosed embodiments.

FIG. 9 illustrates establishment of a secure communication channel between the wireless communication device 170 and the central module 140 of the vehicle 110 when the wireless communication device 170 comes within the authorization range 530 of the vehicle 110, but has not established a data connection with the KPS 410. When the wireless communication device 170 comes within the authorization range 530, the pre-registered PIN (that was entered by the user of the wireless communication device 170) can then be used along with the most recently obtained public key to encrypt information communicated to the central module 140. On the other hand, the central module 140 uses the PIN and the along with a digital certificate that is signed with the private key to encrypt information that is to be sent to the wireless communication device 170.

Figure 10:
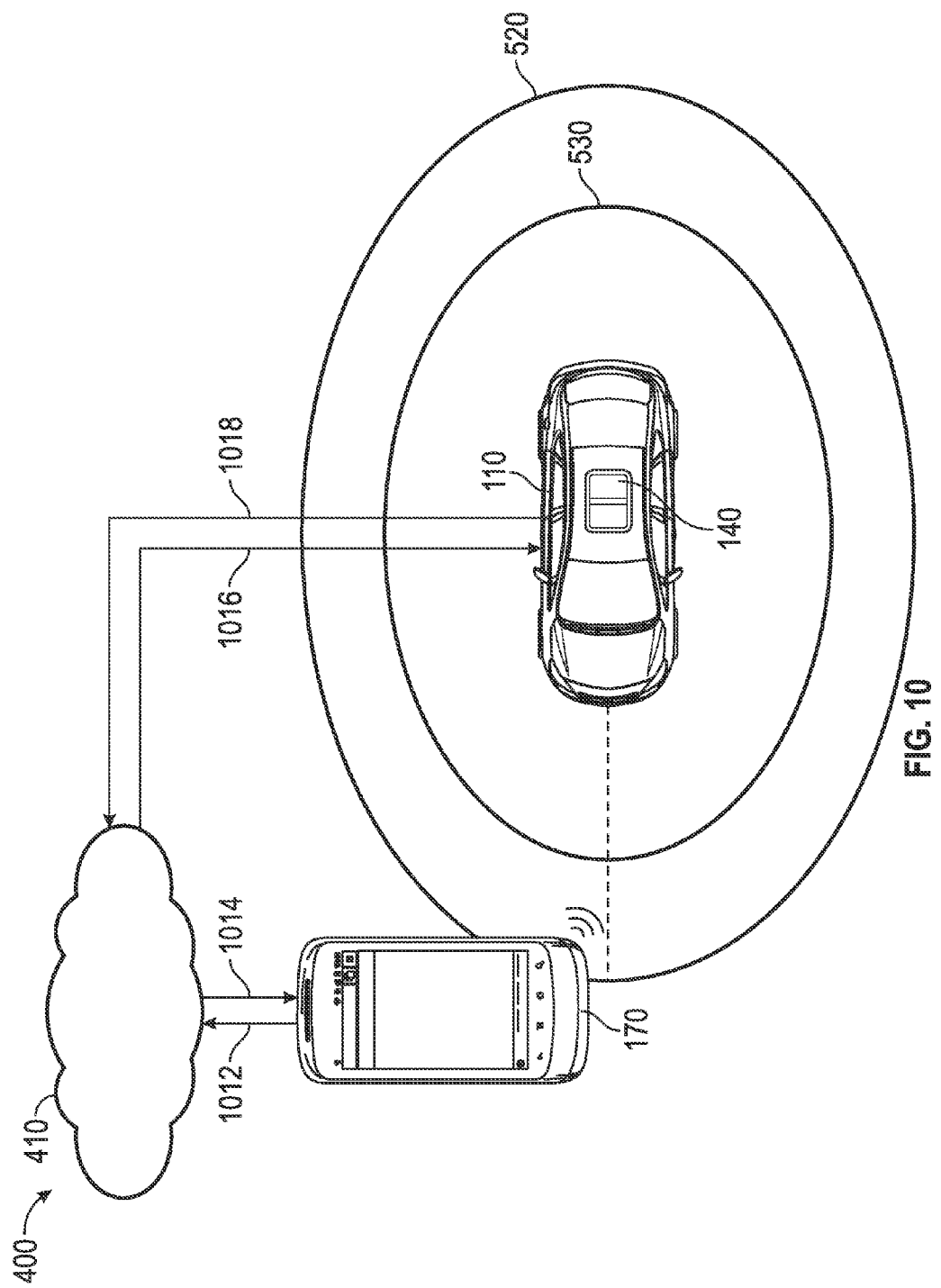
FIG. 10 illustrates retrieval of a new public key by the wireless communication device from the key provisioning server when the wireless communication device moves back within Bluetooth advertising range so that the wireless communication device can initiate a new secure communication session with the central module of the vehicle in accordance with the disclosed embodiments.

FIG. 10 illustrates retrieval of a new public key by the wireless communication device 170 from the key provisioning server 410 when a connection has been re-established with the key provisioning server 410. In particular, when the wireless communication device 170 moves back within Bluetooth advertising range 520 of the vehicle (e.g., approximately 100 meters in one implementation), the wireless communication device 170 can retrieve a new public key (using the request/response exchanges that is described above with reference to FIG. 5). To explain further, the device 170 will have to obtain a new key for communications with the central module 140 of the vehicle 110. This way, the wireless communication device 170 can conduct a new secure communication session with the central module 140 of the vehicle, in which the new public key can then used to encrypt or decrypt information communicated between the wireless communication device and the central module during that new communication session. The old public key (that was temporarily stored in memory at the wireless communication device) can then be deleted. If within Bluetooth range and a session has already been opened, once a connection has been re-established with the KPS 410, a new key can be issued and then immediately used for the current session.

Figure 11:
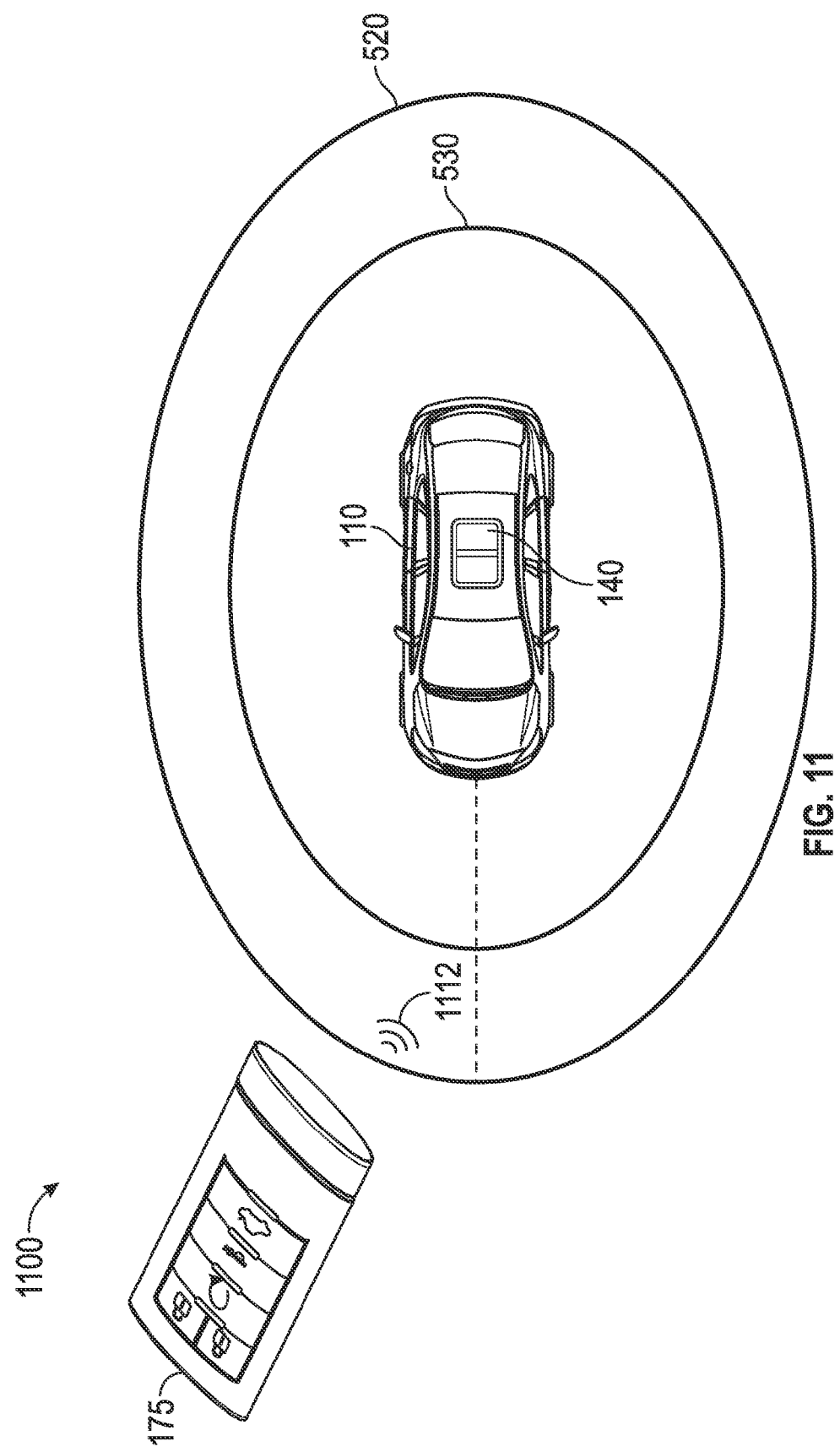
FIG. 11 is a diagram of the system that illustrates a method for distributing a public key to a key fob when the key fob comes within Bluetooth advertising range in accordance with the disclosed embodiments.

Secure Establishment of an Authorized Connection Between Key Fob and Central Module using Public/Private Key Pair FIG. 11 is a diagram of a system 1100 that illustrates a method for distributing a public key to a key fob 175 when the key fob 175 comes within Bluetooth advertising range 520 in accordance with the disclosed embodiments. When the key fob 175 comes within Bluetooth advertising range 520 of the vehicle, the key fob 175 will establish secure communication if an RKE function is performed.

Figure 12:
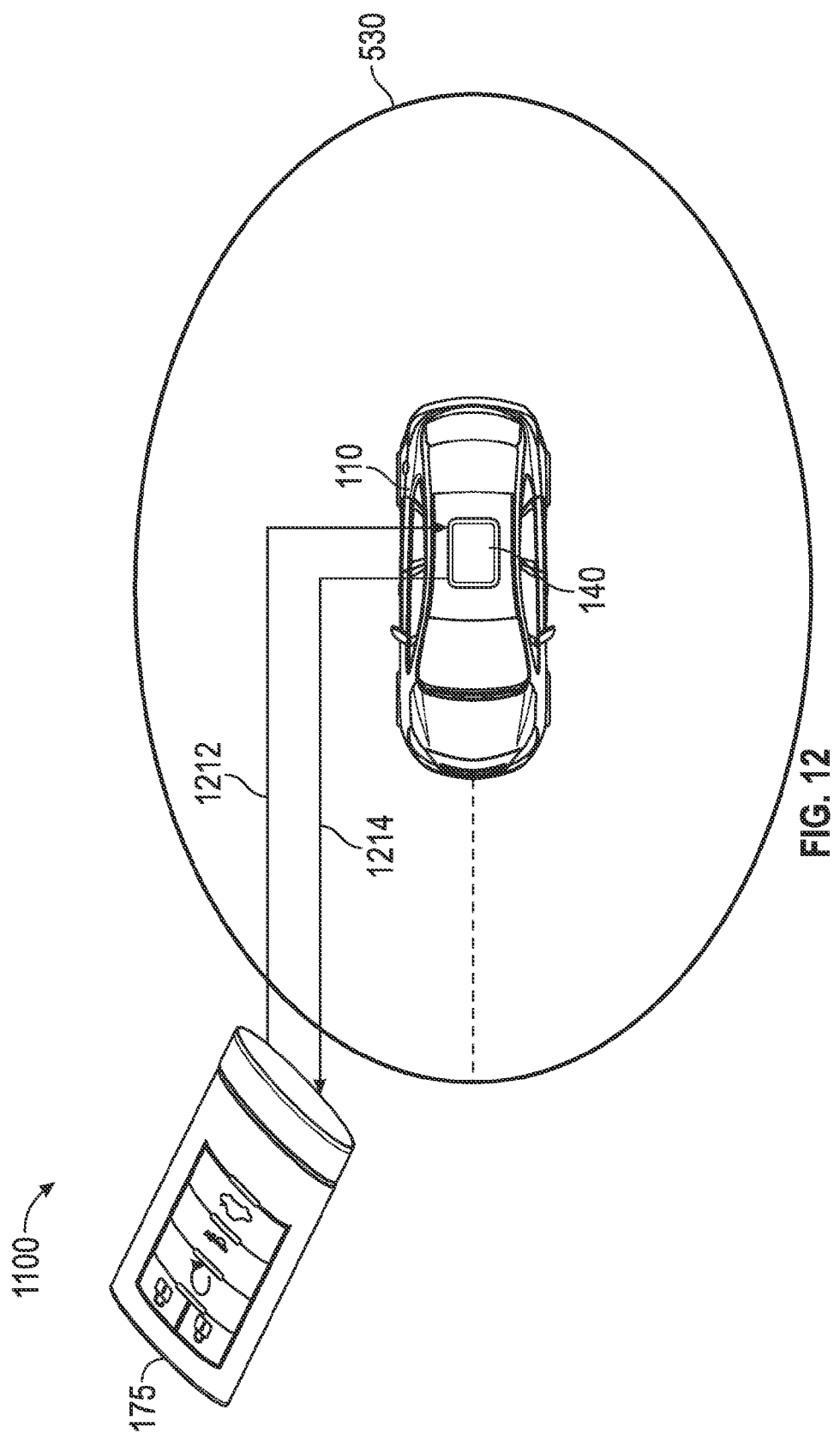
FIG. 12 is a diagram of the system of FIG. 11 that illustrates a method for secure communication between the key fob when the key fob comes within the authorization range of the vehicle in accordance with the disclosed embodiments.

FIG. 12 is a diagram of the system 1100 of FIG. 11 that illustrates a method for secure communication between the key fob 175 when the key fob 175 comes within the authorization range 530 of the vehicle 110 in accordance with the disclosed embodiments. When the key fob 175 comes within range for authorized connection with vehicle, the public key along with the digital certificate signed by the private key from the vehicle will be used to encrypt the data being sent over a secure Bluetooth channel between central module 140 and wireless communication device 170, and for any future messages communicated during that particular communication session. Again, a rolling-code infrastructure for the public key is used to prevent relay/replay attacks from unauthorized devices.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system, comprising:
a portable wireless communication device;
a vehicle, comprising: a central module configured to establish a wireless connection with the portable wireless communication device to initiate a current communication session, wherein the portable wireless communication device communicates a request message when the wireless connection is established with the central module, wherein the request message requests temporary security information, wherein the portable wireless communication device is used to access the vehicle; and
a key provisioning server, communicatively coupled to the portable wireless communication device via a first wireless communication link and the central module via a second wireless communication link, wherein the key provisioning server is configured to provide, in response to the request message, the temporary security information to the portable wireless communication device and the central module,
wherein the temporary security information is used to encrypt communications between the portable wireless communication device and the central module.

2. A system according to claim 1, wherein the portable wireless communication device is configured to temporarily store the temporary security information until a confirmation is made that the current communication session has ended.

3. A system according to claim 1, wherein the portable wireless communication device and/or the central module confirm that the current communication session has ended when the wireless connection has terminated for a particular time period.

4. A system according to claim 1, wherein the portable wireless communication device and/or the central module confirm that the current communication session has ended when the wireless connection has terminated a particular number of times during a time period.

5. A system according to claim 1, wherein the portable wireless communication device communicates a new request message requesting new temporary security information each time the portable wireless communication device determines that the current communication session has ended and that a communication connection is available between the portable wireless communication device and the key provisioning server.

6. A system according to claim 2, wherein the key provisioning server receives a registration message from the portable wireless communication device that includes an identifier for the portable wireless communication device and a personal identification number for the portable wireless communication device, wherein the key provisioning server communicates the identifier and the personal identification number to the central module, and when it has been confirmed that the current communication session has ended and the portable wireless communication device determines that no communication connection is available between the portable wireless communication device and the key provisioning server, wherein the portable wireless communication device is configured to display a user prompt for entry of a personal identification number that allows the temporary security information that is temporarily stored to continue to be used to encrypt communications between the portable wireless communication device and the central module even though it has been confirmed that the current communication session has ended.

7. A system according to claim 1, wherein the security information comprises:
a cryptographic key.

8. A system according to claim 7, wherein the security information further comprises:
a digital certificate signed with a private key.

9. A system according to claim 1, wherein the portable wireless communication device is a Bluetooth enabled consumer electronics device.

10. A system according to claim 1, wherein the portable wireless communication device is a personal portable wireless communication device capable of communicating over a cellular network.

11. A method, comprising:
establishing, between a central module of a vehicle and a portable wireless communication device, a wireless connection to initiate a current communication session, wherein the portable wireless communication device is used to access the vehicle;
communicating, from the portable wireless communication device, a request message when the wireless connection is established with the central module, wherein the request message requests temporary security information; and
providing, from a key provisioning server in response to the request message, the temporary security information to the portable wireless communication device via a first wireless communication link and the central module via a second wireless communication link, wherein the temporary security information is used to encrypt communications between the portable wireless communication device and the central module.

12. A method according to claim 11, further comprising:
temporarily storing the temporary security information at the portable wireless communication device until a confirmation is made that the current communication session has ended.

13. A method according to claim 11, further comprising:
determining whether the wireless connection has terminated for a particular time period; and
confirming, at the portable wireless communication device and/or the central module, that the current communication session has ended when the wireless connection has terminated for a particular time period.

14. A method according to claim 11, further comprising:
determining whether the wireless connection has terminated for a particular time period; and
confirming, at the portable wireless communication device and/or the central module, that the current communication session has ended when the wireless connection has terminated a particular number of times during a time period.

15. A method according to claim 11, further comprising:
communicating, from the portable wireless communication device each time the portable wireless communication device determines that the current communication session has ended and that a communication connection is available between the portable wireless communication device and the key provisioning server, a new request message requesting new temporary security information.

16. A method according to claim 12, wherein the key provisioning server receives a registration message from the portable wireless communication device that includes an identifier for the portable wireless communication device and a personal identification number for the portable wireless communication device, wherein the key provisioning server communicates the identifier and the personal identification number to the central module, and when it has been confirmed that the current communication session has ended and the portable wireless communication device determines that no communication connection is available between the portable wireless communication device and the key provisioning server,
displaying a user prompt at the portable wireless communication device for entry of a personal identification number that allows the temporary security information that is temporarily stored to continue to be used to encrypt communications between the portable wireless communication device and the central module even though it has been confirmed that the current communication session has ended.

17. A method according to claim 11, wherein the security information comprises:
a cryptographic key.

18. A method according to claim 17, wherein the security information further comprises:
a digital certificate signed with a private key.

19. A method according to claim 11, wherein the portable wireless communication device is a Bluetooth enabled consumer electronics device.

20. A method according to claim 11, wherein the portable wireless communication device is a personal portable wireless communication device capable of communicating over a cellular network.

* * * * *